United States Patent [19]

Nowman

[11] Patent Number: 4,978,257

[45] Date of Patent: Dec. 18, 1990

[54] SAFE DRILLING RIG

[76] Inventor: William G. Nowman, P.O. Box 143, Tonopah, Ariz. 85354

[21] Appl. No.: 683,727

[22] Filed: Dec. 19, 1984

[51] Int. Cl.$^5$ .............................................. B23B 47/28
[52] U.S. Cl. ................................ 408/111; 408/115 R; 408/137
[58] Field of Search ................... 408/111, 137, 115 R, 408/88, 92, 99, 101, 103, 138

[56] References Cited

U.S. PATENT DOCUMENTS

| | | | |
|---|---|---|---|
| 2,813,439 | 11/1957 | Gracon | 408/115 |
| 4,090,805 | 5/1978 | Grimsley | 408/111 |
| 4,197,041 | 4/1980 | Prewitt | 408/111 |
| 4,533,284 | 8/1985 | Agius et al. | 408/111 |

Primary Examiner—Daniel W. Howell
Attorney, Agent, or Firm—Fulwider, Patton, Rieber, Lee & Utecht

[57] ABSTRACT

A drilling rig for boring holes in the door of a combination safe includes a bracket for clamping the rig to the door of the safe, an upstanding U-shaped drill frame carried by the clamping bracket and a bearing assembly including a drill shaft journaled for rotation in an elongate outer barrel having internal thrust bearings. Axial movement of the entire bearing assembly is effected by rotating the barrel against mating threads carried by the drill frame. Thrust loads are distributed from the bearing assembly, through the drill frame and clamping bracket to the safe. A chuck is provided for fixing a drill bit to the inner end of the drill shaft. This insulates the motor used to rotate the drill shaft from all thrust loads.

1 Claim, 2 Drawing Sheets

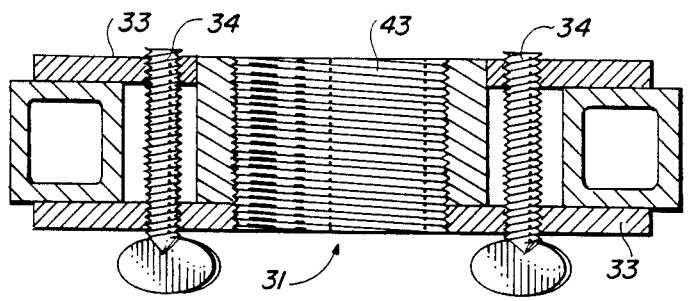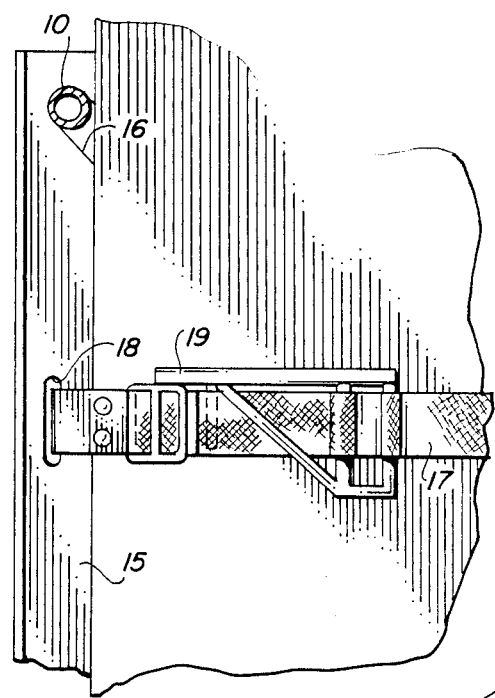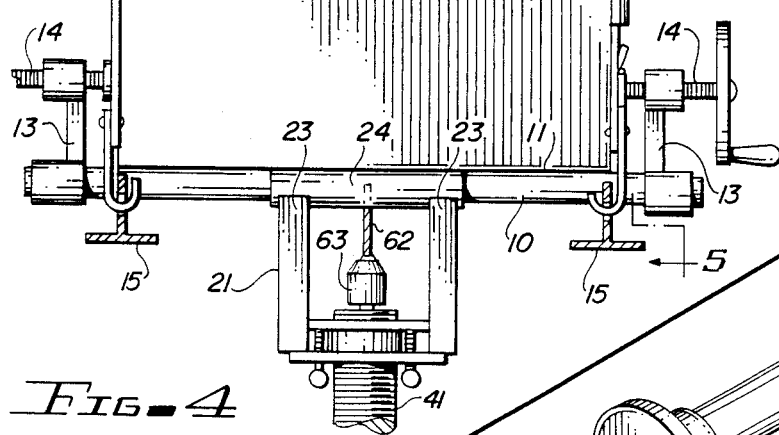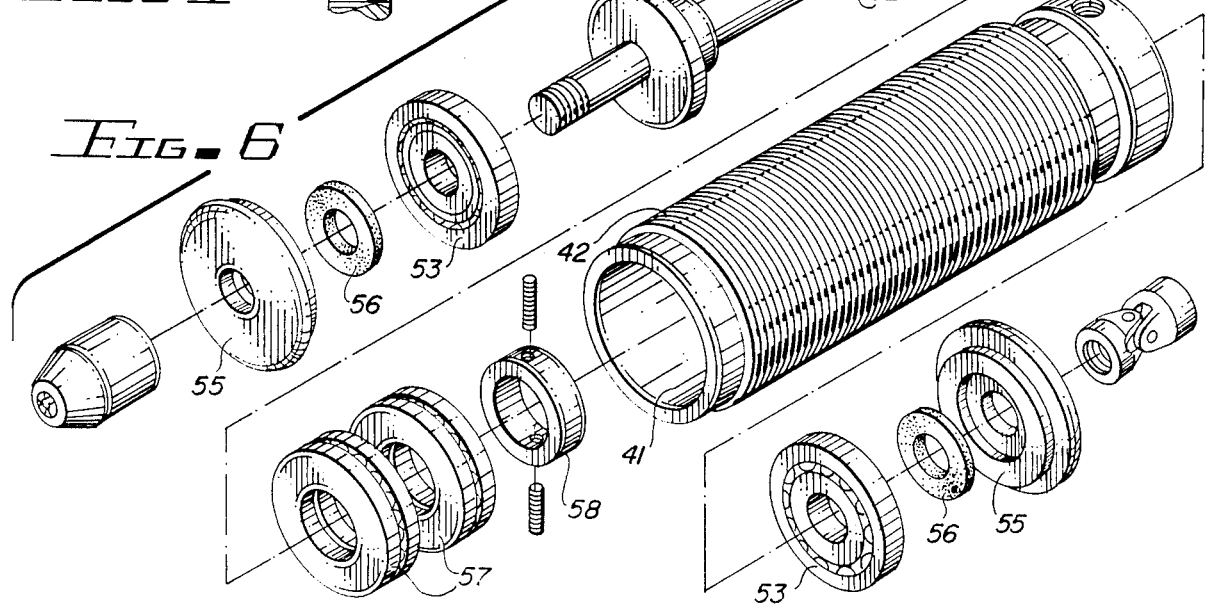

SAFE DRILLING RIG

This invention relates to drilling rigs for boring holes in the door of a combination safe.

More particularly, the invention pertains to a drilling rig for adjustably positioning rotatable drill bit to very accurately drill an inspection hole in the face of the door of a combination safe.

Even more particularly, the invention pertains to a safe drilling rig which is portable and which may be quickly and conveniently positioned to drill an inspection hole in the door of a combination safe and which absorbs the considerable thrust loads from the drill bit such that a conventional hand-held drill can be used to power rotation of the drill bit.

On occasion it is necessary to open a combination safe without access to the combination. In such instances, it is common practice by safe and vault technicians to drill a small hole into the face of the safe door close to the combination lock which will accommodate insertion of a borescope or similar sighting device which permits visual observation of the combination lock mechanism during manipulation.

In order to perform this drilling operation quickly and to minimize the door damage it is desirable to drill as small a hole as possible In turn, this requires very accurate positioning of the drill bit during the drilling operation and quick and convenient replacement of the bit, when necessary.

When the drilling operation is to be performed at the location of the safe rather than in a safe maintenance or repair shop where heavy duty drilling equipment is available, it has been difficult to acquire the desired drilling accuracy and, furthermore, the axial or "thrust" loads applied to the bearing assemblies of conventional portable drilling equipment such as hand-held electric drills has resulted in damage or destruction of the portable drills when sufficient thrust force is applied to the drill bit to penetrate specially hardened plates which are conventionally placed in safe doors to discourage such procedures.

It would therefore be highly advantageous to provide a drilling rig specially adapted for accurately and quickly boring small visual access holes in the doors of conventional combination safes.

It would also be highly advantageous to provide such a drilling rig which would quickly and conveniently permit replacement of the drill bit without requiring complete removal and relocation of the drilling rig after bit replacement.

It would also be highly advantageous to provide such a drilling rig which absorbs the considerable thrust loads which are necessarily exerted on the drill bit to penetrate hard plates in the safe door, thereby insulating portable drill motors from such loads, preventing costly and inconvenient replacement of the motors.

Therefore the principal object of the present invention is to provide an improved drilling rig for drilling holes in the doors of combination safes.

Yet another object of the invention is to provide a safe drilling rig which is portable and which can be used to quickly and conveniently bore an inspection hole in a combination lock located in the door of a safe.

Still another object of the invention is to provide a portable safe drilling rig which insulates the drill motor from thrust loads to prevent destruction of portable drill motors when considerable thrust loads required to penetrate safe doors are applied to the drill bit.

These and other, further and more specific objects and advantages of the invention will be apparent to those skilled in the art from the following detailed description thereof, taken in conjunction with the drawings in which:

FIG. 3 is a sectional view of the bearing support portion of the drill frame of the apparatus of FIGS. 1-2, taken along section line 3—3 thereof;

FIG. 4 is a plan view of the drilling rig of FIGS. 1-3, shown mounted on a typical safe;

FIG. 5 is an elevation view showing the presently preferred way of mounting the drilling rig on the safe as shown in FIG. 4, taken along viewing line 5—5 of FIG. 4; and FIG. 6 is an exploded perspective view showing the components and their relationship of the bearing assembly of FIG. 2.

Figure 1:
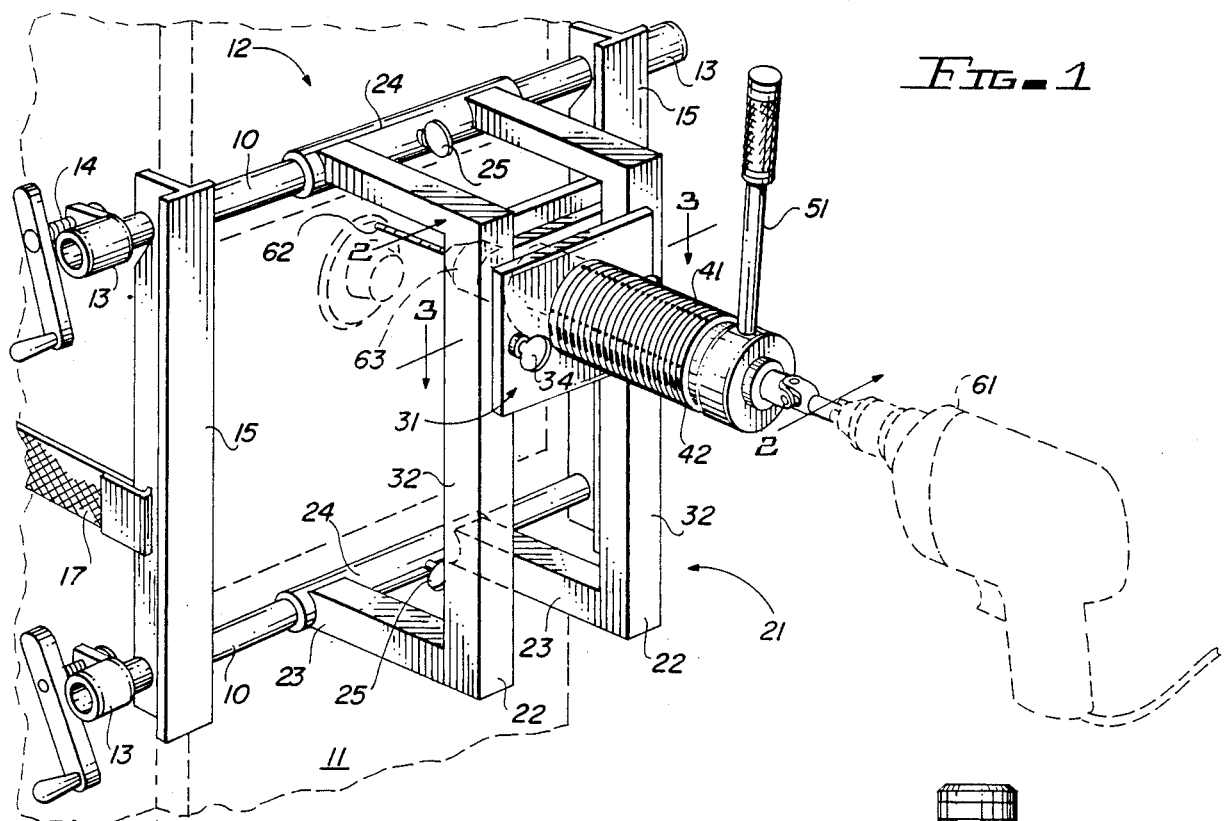
FIG. 1 is a perspective view of a safe drilling rig, constructed in accordance with the principles of the present invention.
Figure 2:
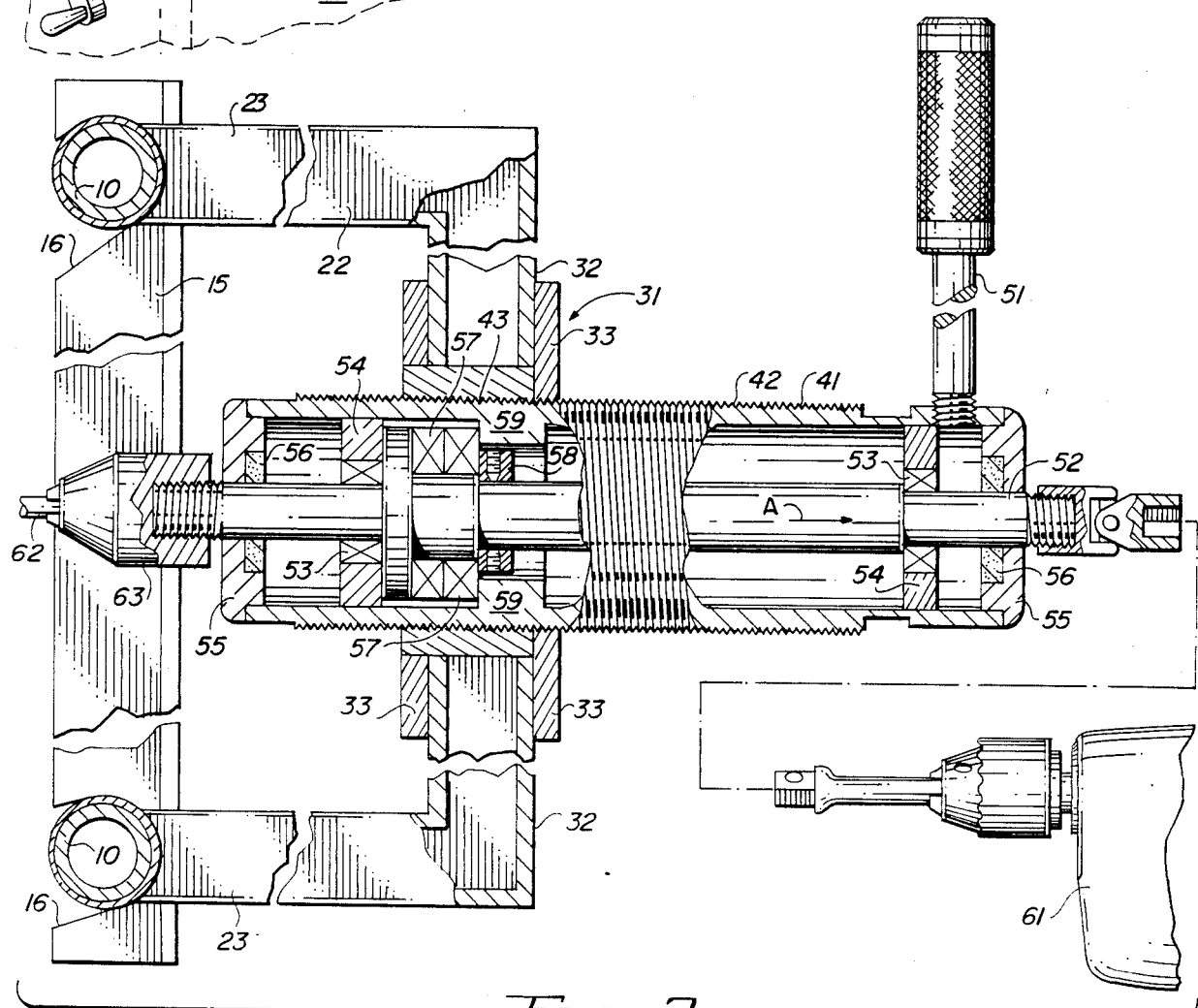
FIG. 2 is a sectional view of the safe drilling rig of FIG. 1, taken along section line 2—2 thereof.

Briefly, in accordance with the invention, I provide a drilling rig for boring holes in the door of a combination safe. The drilling rig comprises a clamping bracket assembly, a drill frame carried by the clamping bracket and a bearing assembly carried by the bearing support of the drill frame.

The clamping bracket includes spaced drill-frame mounting bars, dimensioned to lie across the face of the door of said safe and means for clamping the drill-frame mounting bars to the door face on opposite sides of the combination lock The drill frame includes a generally U-shaped bearing support, the legs of which are carried by the spaced mounting bars and bearing support means carried on the bottom of the U-shaped bearing support to position the bearing over the intended drilling location The bearing assembly includes an elongate cylindrical outer barrel, an elongate drill shaft journaled for rotation in the barrel and thrust bearings carried internally of the barrel for receiving thrust loads from the drill shaft and for distributing these thrust loads to the barrel drill frame and clamping bracket. The cylindrical barrel has screw threads formed in the outer surface thereof which engage mating threads formed in an aperture in the bearing support. These threads cooperate with means for rotating the barrel to axially advance the barrel toward the face of the door during the drilling operation to apply the necessary force on the drill bit to accomplish the drilling step.

All drill force on the drill bit is exerted by rotation of the barrel and little or no thrust load is transmitted to a motor which may be used to rotate the drill bit.

Turning now to the drawings, in which like reference numerals denote the same elements in the several views, the drilling rig includes a clamping bracket assembly, a pair of spaced drill-frame mounting bars 10 which lie across and extend past the edges of the door face 11 of a safe (generally indicated by reference numeral 12). The ends of the mounting bars 10 are provided with sliding clamps 13 having inwardly extending threaded adjustable legs 14 which are used to position the mounting bars 10 in vertically spaced, generally parallel relation across the face 11 of the safe 12. Ruggedly constructed clamping bars 15 having angled slots 16 engage the mounting bars 10 and hold them securely in place against the face 11 of the safe 12. A girth strap 17 encircles the safe 12. The ends of the strap 17 are secured through the holes 18 in the clamping bars 15. The strap 17 is fastened and tightened by means of the buckle 19.

The drill frame, generally indicated by reference numeral 21, includes generally U-shaped members 22 (here shown as separate elements, but which could be combined in a single piece), the inner ends 23 of which are supported and carried by the spaced mounting bars 10 through slideable sleeves 24 provided with locking screws 25 which permit the drill frame to be positioned transversely along the length of the mounting bars 10. Bearing support means in the form of a slideable bracket, generally indicated by reference numeral 31 (see especially FIG. 4), are carried on the outer bottom portions 32 of the U-shaped bearing supports 22. The bracket 31 includes spaced shoulders 33 which receive the bottom portions 32 of the U-shaped bearing supports 22. The shoulders 33 are provided with tightening screws 34 which permit the bracket to be positioned vertically along the rails 32 of the drill frame 21.

The bearing assembly includes an elongate cylindrical outer barrel 41 having screw threads 42 formed in the outer surface thereof which engage mating internal threads 43 formed in an aperture in the bearing support bracket 31 (see FIG. 3). A handle 51 extends radially from the barrel 41 for the purpose of rotating the barrel to axially advance it on the mating threads 42 and 43 toward the face 11 of the safe 12. An elongate drill shaft 52 is journaled for rotation in the barrel 41 by means of centering bearings 53 located on inwardly extending shoulders 54 of the barrel 41. End caps 55 provided with dust seals 56 close the open ends of the barrel 41. Stacked thrust bearings 57, located on the rotatable drill shaft 52 by means of cylindrical collar 58 are seated on inwardly extending shoulders 59 of the barrel 41. These thrust bearings 57 transmit axial loads in the direction of the arrow A exerted on the drill shaft 52 to the barrel 41. These loads are, in turn, transmitted through the drill frame 21 to the clamping bracket assembly and, ultimately, to the safe itself.

In operation, rotation of the handle 51 causes axial movement of the barrel 41 toward the face 11 of the safe 12. Rotational force exerted by the hand drill 61 of the shaft 52 causes rotation of a drill bit 62 held by chuck 63 but, thrust loads on the shaft 52 are insulated from the drill 61.

Having described my invention in such terms as to enable those skilled in the art to understand and practice it and, having described the presently preferred embodiment thereof, I claim:

1. A drilling rig for boring holes in the door of a combination safe comprising:
 (a) a clamping bracket assembly, including
  (i) spaced drill-frame mounting bars, dimensioned to lie across the face of the door of said safe,
  (ii) means for clamping said drill-frame mounting bars to said door face on opposite sides of the combination lock on said door;
 (b) a drill frame, including
  (i) a generally U-shaped support bracket, including a bottom member terminating in legs which extend toward and are carried on said spaced mount bars, and
  (ii) bearing support means carried on said bottom member of said support bracket;
 (c) a bearing assembly carried on said bearing support and positioned over the intended drilling location on the face of said safe door, including
  (i) an elongate cylindrical outer barrel with screw threads formed in the outer surface thereof which engage mating internal threads formed in an aperture in said bearing support,
  (ii) means for rotating said barrel to axially advance said barrel on said mating threads toward the face of said door,
  (iii) an elongate drill shaft journaled for rotation in said barrel, and
  (iv) thrust bearing means carried internally of said barrel for receiving thrust loads on said drill shaft and distributing said thrust loads to said barrel, drill frame and clamping bracket;

all drilling force exerted axially on said drill bit being exerted by rotation of said barrel in said bearing support.

* * * * *